United States Patent [19]
Snowden

[11] 3,909,066
[45] Sept. 30, 1975

[54] PLASTIC WHEEL CONSTRUCTION FOR OVERHEAD CONVEYORS

[75] Inventor: Bryan T. Snowden, Grapevine, Tex.

[73] Assignee: F.E.I., Inc., Dallas, Tex.

[22] Filed: Apr. 29, 1974

[21] Appl. No.: 464,967

[52] U.S. Cl. .............................. 301/63 PW; 301/111
[51] Int. Cl.² .......................................... B60B 1/06
[58] Field of Search .... 301/63 PW, 111, 1, 2, 63 R, 301/108 R, 108 A, 112, 114, 115, 122; 105/150

[56] References Cited
UNITED STATES PATENTS

| | | | |
|---|---|---|---|
| 2,757,054 | 7/1956 | Van De Warker | 301/63 PW |
| 2,978,277 | 4/1961 | Gaudry | 301/111 |
| 3,492,055 | 1/1970 | Frankland | 301/63 PW |
| 3,738,477 | 6/1973 | Gename | 105/150 |

Primary Examiner—M. Henson Wood, Jr.
Assistant Examiner—D. W. Keen
Attorney, Agent, or Firm—Richards, Harris & Medlock

[57] ABSTRACT

A wheel construction for overhead conveyors includes a stainless steel shaft having a threaded end portion, a cylindrical bearing portion, and a cylindrical retaining portion. The retaining portion comprises opposed, substantially radially extending surfaces, one comprising the intersection between the bearing portion and the retaining portion of the shaft and the other comprising the end of the shaft remote from the threaded end portion. A plastic wheel formed from a self-lubricating thermoplastic material has an opening formed therein including a first cylindrical portion dimensioned for direct rotatable engagement with the bearing portion of the shaft and a second cylindrical portion for receiving the retaining portion of the shaft. A cap formed from a self-lubricating thermoplastic material is received in the second cylindrical portion of the opening in the wheel for securing the wheel in rotatable engagement with the shaft. The wheel includes a surface for engaging one of the radially extending surfaces of the retaining portion of the shaft and the cap includes a surface for engaging the opposite radially extending surface of the retaining portion of the shaft. Structure is provided for mechanically retaining the cap in the second cylindrical portion of the opening in the wheel.

19 Claims, 4 Drawing Figures

PLASTIC WHEEL CONSTRUCTION FOR OVERHEAD CONVEYORS

FIELD OF THE INVENTION

This invention relates to conveyor wheels, and more particularly to an improved plastic wheel assembly for use in overhead conveyors, and the like.

THE PRIOR ART

Overhead conveyors are commonly used in a variety of applications in manufacturing and fabrication facilities, and in food processing plants, such as those designed for processing fowl. Generally, such overhead conveyors comprise numerous wheels which support conveyor brackets and travel along an overhead beam. Shackles or the like are connected to the conveyor brackets for supporting articles to be processed, such as fowl carcasses. The wheels are rolled along the overhead beam by motor driven chains or other suitable drive mechanisms.

Conventionally such overhead conveyor wheels are constructed from metal and are supported by antifriction bearings. One disadvantage of the prior art metal wheels is that they are subject to corrosion. Also, the antifriction bearings of such conveyor wheels typically require periodic lubrication. Another disadvantage relates to the fact that many prior overhead conveyor wheels tends to wear severely at the bearing location. This in turn causes the conveyor wheels to bind when rounding turns or changing elevations.

U.S. Pat. No. 3,789,925 granted Jan. 29, 1974, to Clarence A. Dawson and assigned to the Assignee of the present application discloses a plastic wheel assembly comprising a substantial improvement over the foregoing metal-type overhead conveyor wheel. In accordance with the Dawson invention, a wheel assembly includes a shaft and a ferrule having a hollow cylindrical section for receiving the shaft and a conically outwardly flared end section. A wheel is constructed from a self-lubricating thermoplastic material and includes a central opening for receiving the ferrule. The central wheel opening includes at one end a conical portion for generally mating with the flared end section of the ferrule.

SUMMARY OF THE INVENTION

The present invention comprises a further improvement in the art of plastic wheel assemblies. In accordance with the broader aspect of the invention, there is provided a shaft having a bearing portion and a retaining portion. A wheel formed from a self-lubricating plastic material is provided with a central opening including a first portion for receiving the bearing portion of the shaft and a second portion for receiving the retaining portion of the shaft. A cup formed from a self-lubricating thermoplastic material is received in the second portion of the opening in the wheel for cooperation with the wheel and with the retaining portion of the shaft to secure the wheel in rotatable engagement with the shaft.

In accordance with the more specific aspects of the invention, the shaft may be formed from a noncorrosive metal, such as stainless steel. One end of the shaft is threaded and extends to a shoulder positioned for cooperation with the threaded end portion of the shaft to attach the wheel assembly to a conveyor bracket. The distal end of the threaded end portion of the shaft is provided with structure for selectively preventing rotation of the shaft and thereby facilitating mounting of the wheel assembly.

In accordance with still more specific aspects of the invention, the retaining portion of the shaft includes opposed, substantially radially extending surfaces. The central opening through the plastic wheel includes a surface for engagement with one of the substantially radially extending surfaces of the retaining portion of the shaft. Similarly, the plastic cap includes a surface for engagement with the opposite substantially radially extending surface of the retaining portion of the shaft. Structure is provided for mechanically retaining the cap in the second portion of the opening through the plastic wheel.

DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
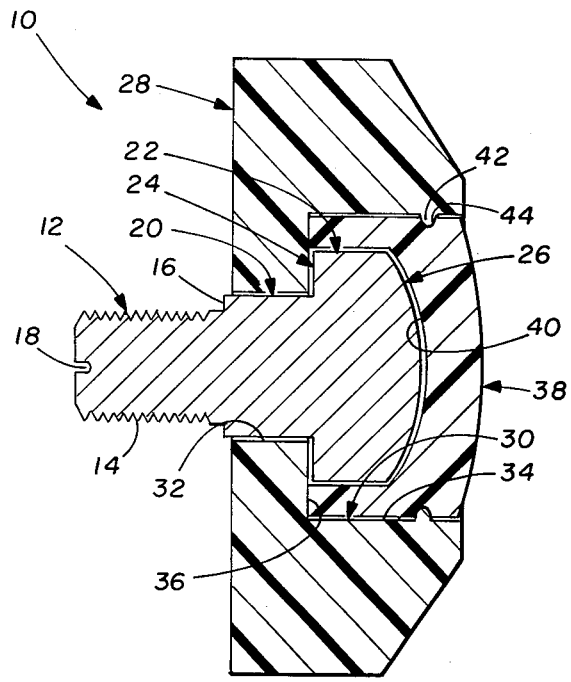
FIG. 1 is a sectional view illustrating a first embodiment of the invention.

Referring now to the Drawings, and particularly to FIG. 1 thereof, there is shown a wheel assembly 10 incorporating a first embodiment of the invention. The wheel assembly 10 includes a shaft 12 which may be formed from a suitable noncorrosive metal, such as stainless steel. The shaft 12 has a threaded end portion 14 extending to a shoulder 16. The shoulder 16 is positioned for cooperation with the threaded end portion 14 to secure the wheel assembly 10 to the bracket of an overhead conveyor, or the like.

The distal end of the threaded end portion of the shaft 12 is provided with a slot 18 dimensioned to receive a screwdriver or similar tool. This is for the purpose of selectively preventing rotation of the shaft 12 and thereby facilitating the mounting of the wheel assembly 10 on an overhead conveyor bracket, or the like. Those skilled in the art will appreciate the fact that the slot 18 may be replaced by a hexagonal hole adapted to receive an Allen wrench, or other structure adapted to receive a suitable tool and thereby selectively prevent rotation of the shaft 12.

The shaft 12 of the wheel assembly 10 further includes a cylindrical bearing portion 20 and a cylindrical retaining portion 22. In the embodiment of the invention illustrated in FIG. 1, the bearing portion 20 comprises a relatively small diameter portion, and the retaining portion 22 comprises a relatively large diameter portion. The retaining portion 22 is further characterized by opposed, substantially radially extending surfaces 24 and 26. More particularly, the substantially radially extending surface 24 comprises the intersection between the relatively small diameter bearing portion 20 and the relatively large diameter retaining portion 22 of the shaft 12. The substantially radially extending surface 26 comprises the end surface of the shaft 21 remote from the threaded end portion 14.

The wheel assembly 10 further includes a wheel 28 formed from a self-lubricating thermoplastic material. The wheel 28 has a central opening 30 formed therethrough including a first cylindrical portion 32 and a second cylindrical portion 34. The first cylindrical portion 32 of the opening 30 receives the bearing portion 20 of the shaft 12 and is dimensioned for direct rotatable engagement with the bearing portion 20. The second cylindrical portion 34 of the opening 30 receives a retaining portion 32 of the shaft 12. The opening 30 further comprises a surface 36 adapted for engagement with the substantiallly radially extending surface 24 of the shaft 12.

A cap 38 formed from a self-lubricating thermoplastic material is received in the second cylindrical portion 34 of the central opening 30 formed in the wheel 28 for cooperation with the wheel 28 and with the retaining portion 22 of the shaft 12 to secure the wheel 28 in rotatable engagement with the shaft 12. The cap 38 includes a surface 40 positioned for engagement with the substantially radially extending surface 26 of the shaft 12. Moreover, it will be understood that the wheel 28 and the cap 38 comprise surfaces which completely surround all of the surfaces of the bearing portion 20 and the retaining portion 22 of the shaft 12. This is highly advantageous in providing a completely sealed structure, thereby preventing the occurrence of contamination within the wheel assembly 10 and thus assuring sanitation.

The wheel 28 is provided with a circumferentially extending rim 42 and the cap 38 is provided with a corresponding groove 44, whereby the cap 38 is retained in the second cylindrical portion 34 of the central opening 30 in the wheel 28 by means of a snap fit. It will be understood that other suitable structure may be provided for securing the cap 38 in the central opening 30 of the wheel 28. For example, the wheel and the cap may be provided with cooperating threads. Screws or other suitable fasteners may also be used. Finally, the cap 38 may be adhesively retained in the opening 30 formed in the wheel 28.

Figure 2:
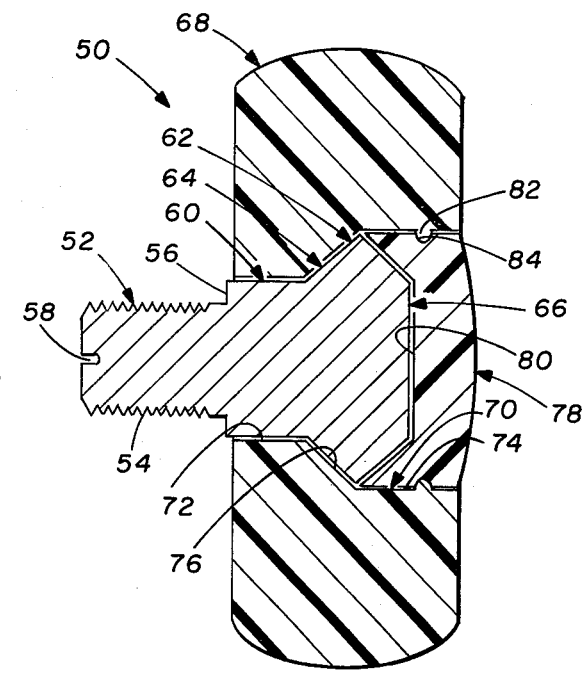
FIG. 2 is a sectional view illustrating a second embodiment of the invention.

Referring now to FIG. 2, there is shown a wheel assembly 50 comprising a second embodiment of the invention. The wheel assembly 50 includes a shaft 52 which may be formed from a noncorrosive metal, such as stainless steel. The shaft 52 includes a threaded end portion 54 extending to a shoulder 56. The shoulder 56 is positioned for cooperation with the threaded end portion 54 for use in mounting the wheel assembly 50 on a bracket of an overhead conveyor, or similar structure.

The distal end of the threaded end portion 54 is provided with a slot 58 adapted to receive a screwdriver or similar tool. This is to selectively prevent rotation of the shaft 52, thereby facilitating mounting of the wheel assembly 50 on an overhead conveyor bracket, or the like. A hexagonal hole adapted to receive an Allen wrench or other structure adapted to receive a specific tool configuration may be used in the practice of the invention in lieu of the slot 58, if desired.

The shaft 52 of the wheel assembly 50 further comprises a bearing portion 60 and a retaining portion 62. In the particular embodiment of the invention illustrated in FIG. 2, the bearing portion 60 comprises a relatively small diameter portion and the retaining portion 62 comprises a relatively large diameter portion. The retaining portion 62 further comprises opposed, substantially radially extending surfaces 64 and 66. More specifically, the substantially radially extending surface 64 comprises the intersection between the relatively small diameter bearing portion 60 and the relatively large diameter retaining portion 62 of the shaft 52. The substantially radially extending surface 66 comprises the end of the shaft 52 remote from the threaded end portion 54.

The wheel assembly 50 further includes a wheel 68 formed from a self-lubricating thermoplastic material. The wheel 68 has a central opening 70 formed therethrough including a first cylindrical portion 72 and a second cylindrical portion 74. The first cylindrical portion 72 of the opening 70 is dimensioned for direct rotatable engagement with the bearing portion 60 of the shaft 52. The second cylindrical portion 74 receives the retaining portion 62 of the shaft 52. The opening 70 in the wheel 68 further includes a surface 76 adapted for engagement with the substantially radially extending surface 64 of the shaft 52.

A cap 78 formed from a self-lubricating thermoplastic material is received in the second cylindrical portion 74 of the opening 70 in the wheel 68 for cooperation therewith and with the retaining portion 62 of the shaft 52 to secure the wheel 68 in rotatable engagement with the shaft 52. The cap 78 includes a surface 80 adapted for engagement with the substantially radially extending surface 66 of the shaft 52. Moreover, it will be understood that the cap 78 and the wheel 68 comprise surfaces which extend in close proximity to the entire periphery of the bearing portion 60 and the retaining portion 62 of the shaft 52. This is highly advantageous in providing a completely sealed structure, thereby preventing contamination within the wheel assembly and thus assuring sanitation.

The wheel 68 is provided with a circumferentially extending rim 82 and the cap 78 is provided with a cooperating groove 84. By this means the cap 78 is retained in the second portion 74 of the opening 70 in the wheel 68 by means of a snap fit. It will be appreciated that the cap 78 may be retained in the opening 70 by means of various alternative structures. For example, the cap 78 and the wheel 68 may be provided with cooperating threads. Screws or other fasteners may also be used to secure the cap 78 in the opening 70. Finally, the cap 78 may be adhesively retained in the opening 70.

Figure 3:
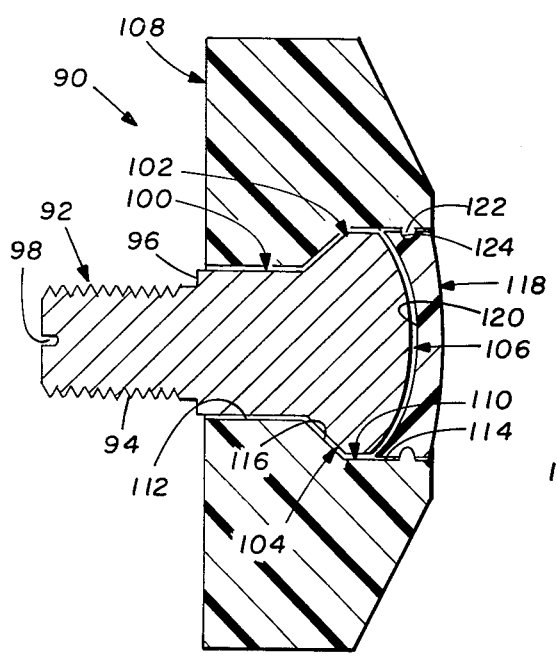
FIG. 3 is a sectional view illustrating a third embodiment of the invention.

Referring now to FIG. 3, there is shown a wheel assembly 90 incorporating a third embodiment of the invention. The wheel assembly 10 includes a shaft 92 which may be formed from a suitable noncorrosive metal, such as stainless steel. The shaft 92 has a threaded end portion 94 extending to a shoulder 96. The shoulder 96 is positioned for cooperation with the threaded end portion 94 to secure the wheel assembly 90 to the bracket of an overhead conveyor, or the like. The distal end of the threaded end portion of the shaft 92 is provided with a slot 98 dimensioned to receive a screwdriver or similar tool. This is for the purpose of selectively preventing rotation of the shaft 92 and thereby facilitating the mounting of the wheel assembly 90 on an overhead conveyor bracket, or the like. Those skilled in the art will appreciate the fact that the slot 98 may be replaced by a hexagonal hole adapted to receive an Allen wrench, or other structure adapted to receive a suitable tool and thereby selectively prevent rotation of the shaft 92.

The shaft 92 of the wheel assembly 90 further includes a cylindrical bearing portion 100 and a cylindrical retaining portion 102. In the embodiment of the invention illustrated in FIG. 3, the bearing portion 100 comprises a relatively small diameter portion, and the retaining portion 102 comprises a relatively large diameter portion. The retaining portion 102 is further characterized by opposed, substantially radially extending surfaces 104 and 106. More particularly, the substantially radially extending surface 104 comprises the intersection between the relatively small diameter bearing portion 100 and the relatively large diameter retaining portion 102 of the shaft 92. The substantially radially extending surface 106 comprises the end surface of the shaft 92 remote from the threaded portion 94.

The wheel assembly 90 further includes a wheel 108 formed from a self-lubricating thermoplastic material. The wheel 108 has a central opening 110 formed therethrough including a first cylindrical portion 112 and a second cylindrical portion 114. The first cylindrical portion 112 of the opening 110 receives a bearing portion 100 of the shaft 92 and is dimensioned for direct rotatable engagement with the bearing portion 100. The second cylindrical portion 114 of the opening 110 receives a retaining portion 112 of the shaft 92. The opening 110 further comprises a surface 116 adapted for engagement with the substantially radially extending surface 104 of the shaft 92.

A cap 118 formed from a self-lubricating thermoplastic material is received in the second cylindrical portion 114 of the central opening 110 formed in the wheel 108 for cooperation with the wheel 108 and with the retaining portion 102 of the shaft 92 to secure the wheel 108 in rotatable engagement with the shaft 92. The cap 118 includes a surface 120 positioned for engagement with the substantially radially extending surface 106 of the shaft 92. Moreover, it will be understood that the wheel 108 and the cap 118 comprise surfaces which completely surround all of the surfaces of the bearing portion 100 and the retaining portion 102 of the shaft 92. This is highly advantageous in providing a completely sealed structure, thereby preventing the occurrence of contamination within the wheel assembly 90 and thus assuring sanitation.

The wheel 108 is provided with a circumferentially extending rim 122 and a cap 118 is provided with a corresponding groove 124, whereby the cap 118 is retained in the second cylindrical portion 114 of the central opening 110 in the wheel 108 by means of a snap fit. It will be understood that other suitable structure may be provided for securing the cap 118 in the central opening 110 of the wheel 108. For example, the wheel and the cap may be provided with cooperating threads. Screws or other suitable fasteners may also be used. Finally, the cap 118 may be adhesively retained in the opening 110 formed in the wheel 108.

Figure 4:
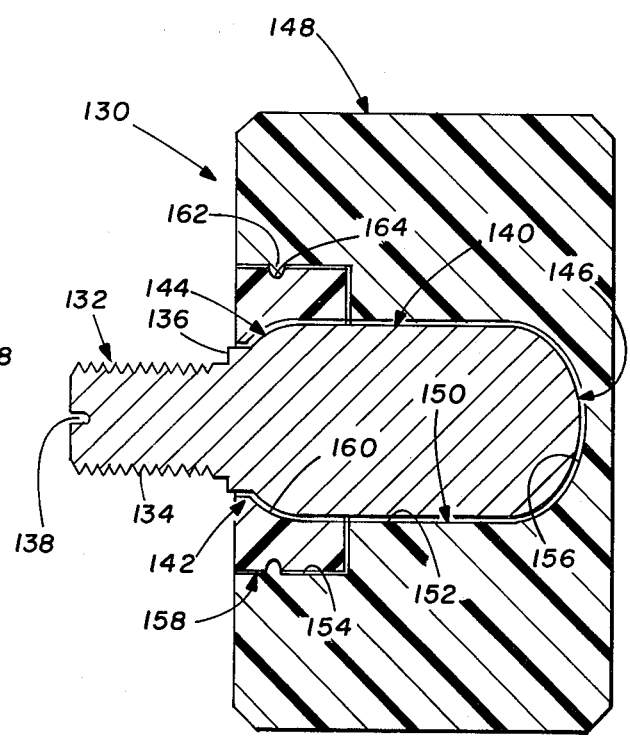
FIG. 4 is a sectional view illustrating a fourth embodiment of the invention.

A wheel assembly 130 incorporating a fourth embodiment of the invention is illustrated in FIG. 4. The wheel assembly 130 includes a shaft 132 having a threaded end portion 134 extending to a shoulder 136. The shoulder 136 is positioned for cooperation with the threaded end portion 134 to facilitate mounting of the wheel assembly 130 on an overhead conveyor bracket, or similar apparatus.

A slot 138 is formed in the distal end of the shaft 132 and is adapted to receive a screwdriver or similar tool. By this means the shaft 132 is selectively prevented from rotation, thereby facilitating the mounting of the wheel assembly 130 on an overhead conveyor bracket, or the like. It will be understood that the slot 138 may be replaced by a hexagonal hole adapted to receive an Allen wrench or by other structure adapted for use in conjunction with selected tools to prevent rotation of the shaft 132 during installation of the wheel assembly 130.

The shaft 132 further includes a cylindrical bearing portion 140 and a cylindrial retaining portion 142. In the specific embodiment of the invention illustrated in FIG. 4, the bearing portion 140 comprises a relatively large diameter portion and the retaining portion 142 comprises a relatively small diameter portion. The shaft 132 further includes opposed, substantially radially extending surfaces 144 and 146. More specifically, the surface 144 comprises the intersection between the relatively large diameter bearing portion 140 and the relatively small diameter retaining portion 142 of the shaft 132. The opposite substantially radially extending surface 146 comprises the end surface of the shaft 132 remote from the threaded end portion 134.

The wheel assembly 130 further includes a wheel 148 formed from a self-lubricating thermoplastic material. The wheel 148 has a central opening 150 formed therein including a first cylindrical portion 152 and a second cylindrical portion 154. The first cylindrical portion 152 in the opening 150 receives the bearing portion 140 of the shaft 132 and is dimensioned for direct rotational engagement with the bearing portion 140. The second cylindrical portion 154 receives the retaining portion 142 of the shaft 132. The wheel 148 further includes a surface 156 adapted for engagement with the substantially radially extending surface 146 of the shaft 132.

A cap 158 formed a self-lubricating thermoplastic material is received in the second cylindrical portion 154 of the opening 150 for cooperation therewith and with the retaining portion of the shaft 132 to secure the wheel 148 in rotational engagement with the shaft 132. The cap 158 includes a surface 160 adapted for engagement with the substantially radiallly extending surface 144 of the shaft 132. Moreover, it will be apparent that the wheel 148 and the cap 158 comprise surfaces which surround substantially the entire periphery of the bearing portion 140 and the retaining portion 142 of the shaft 132. By this means there is formed a completely sealed structure which eliminates any possibility of contamination occurring within the wheel assembly 130, thereby assuring sanitation.

The wheel 148 is provided with a circumferentially extending rim 162 and the cap 158 has a cooperating groove 164. By this means the cap 158 is retained in the opening 150 in the wheel 148 by means of a snap fit. Those skilled in the art will appreciate the fact that various alternative means are available for retaining the cap 158 in engagement with the wheel 148. For example, the cap and wheel could be provided with cooperating threads. Screws or other suitable fasteners may also be used to secure the cap 158 to the wheel 148. Finally, the cap 158 may be adhesively retained in the opening 150.

An important aspect of the conveyor wheel assembly of the present invention is the type of plastic utilized to form the wheels 28, 68, 108 and 148 and the caps 38, 78, 118 and 158. In the preferred embodiment of the invention, an ultrahigh molecular weight polymer having high abrasion resistance and a low coefficient of friction is desired. Such plastic is selflubricating and thus does not require periodic maintenance during use. Moreover, the plastic is not subject to excessive wear problems and does not require expensive ball bearing mounting due to its low coefficient of friction.

A material suitable for use in forming the wheels and caps is the plastic manufactured and sold under the trademark "1900 UHMW" by Hercules Chemical Inc. of Wilmington, Delaware. Alternatively, an ultrahigh molecular weight polymer manufactured and sold under the registered trademark "IMPAX" by Impact Plastics Inc. of Gastonia, North Carolina, may also be utilized. The preferred physical characteristics of an ultrahigh molecular weight polymer to be utilized for the construction of the wheels and caps are as follows:

Coefficient of Friction—0.11
Hardness, Rockwell (D785)—R45
Specific Gravity—.945
Cubic Inches Per Pound—29
Maximum Service Temperature—225° F. (continuous-)—250° F. (intermittently)
Chemical Resistance—highly resistant to all chemicals with the exception of strong oxidizing acids
Abrasion Resistance—unequalled by any other thermoplastic
Tensile Strength—(AT 2 inches Min. as per ASTM D-412, psi)—6,650
FDA Concurrence Schedule—Reg. No. 121.2501

It should be pointed out that the wheels 28, 68, 108 and 148 are illustrated in FIGS. 1–4 has having different exterior peripheries. However, the particular exterior periphery illustrated in conjunction with any one of the wheels may be used on any other wheel, if desired. Moreover, the configuration of the exterior periphery of the wheels is not critical to the practice of the invention, and any of the various exterior configurations commonly used in conjunction with wheels for overhead conveyors and similar devices may be utilized in the practice of the invention.

From the foregoing, it will be understood that the present invention comprises an improvement in plastic wheel assemblies for overhead conveyors incorporating numerous advantages over the prior art. A major advantage in this regard relates to the fact that plastic wheel assemblies incorporating the invention comprise a completely sealed structure, thereby eliminating any possibility from contamination from within the wheel assembly and thus assuring sanitation. Another important advantage relates to the fact that plastic wheel assemblies incorporating the invention may be fabricated from a small number of easily manufactured parts and are therefore economical to manufacture and use. A very important advantage to the use of the invention relates to the fact that plastic wheel assemblies constructed in accordance therewith are adapted to long term use with little or no maintenance, do not require lubrication, are not subject to corrosion, and are not subject to binding or severe wear problems.

Although preferred embodiments of the invention have been illustrated in the accompanying Drawings and described in the foregoing Detailed Description, it will be understood that the invention is not limited to the embodiments disclosed, but is capable of numerous rearrangements, substitutions, and modifications of parts and elements without departing from the spirit of the invention.

What is claimed is:
1. A wheel assembly comprising:
a shaft having a cylindrical bearing portion and a cylindrical retaining portion, said retaining portion including opposed, substantially radially extending surfaces;
a wheel formed from a self-lubricating thermoplastic material and having a central opening formed therethrough including a first cylindrical portion for receiving the cylindrical bearing portion of the shaft and a second cylindrical portion for receiving the cylindrical retaining portion of the shaft, said second cylindrical portion of the opening of the wheel having a surface which engages one of the substantially radially extending surfaces of the retaining portion of the shaft;
a cap formed from a self-lubricating thermoplastic material having a surface which engages the opposite substantially radially extending surface of the retaining portion of the shaft and received in the second cylindrical portion of the opening of the wheel for cooperation therewith and with the retaining portion of the shaft to secure the wheel in rotatable engagement with the shaft; and
cooperating means on the wheel and the cap for retaining the cap in the second cylindrical portion of the opening through the wheel.
2. The wheel assembly according to claim 1 wherein the shaft is formed from a noncorrosive metal.
3. The wheel assembly according to claim 1 wherein the shaft further includes a threaded end portion extending to a shoulder for use in securing the wheel assembly to associated apparatus.
4. The wheel assembly according to claim 3 wherein the threaded portion of the shaft extends from one end thereof and further including means formed in the distal end of the threaded portion of the shaft for use in preventing rotation of the shaft.
5. A wheel assembly comprising:
a metal shaft having a threaded end portion, a bearing portion, and a retaining portion;
said retaining portion of the shaft including opposed, substantially radially extending surfaces;
a wheel formed from a self-lubricating thermoplastic material and having a central opening formed therethrough including a first portion dimensioned for direct rotatable engagement with the bearing portion of the shaft and a second portion for receiving the retaining portion of the shaft;
said second portion of the opening through the wheel including a surface for engagement with one of the radially extending surfaces of the retaining portion of the shaft;
a cap formed from a self-lubricating thermoplastic material and received in the second portion of the opening through the wheel for cooperation therewith and with the retaining portion of the shaft to secure the wheel in rotatable engagement with the shaft;
said cap having a surface for engagement with the opposite radially extending surface of the retaining portion of the shaft; and
means for securing the cap in the second portion of the opening through the wheel.

6. The wheel assembly according to claim 5 wherein the threaded portion of the shaft is formed at one end thereof and extends to a shoulder for cooperation with the threaded portion to secure the shaft to associated apparatus, and further including means formed in the distal end of the threaded portion of the shaft for selectively preventing rotation of the shaft.

7. The wheel assembly according to claim 5 wherein the bearing portion of the shaft comprises a relatively small diameter portion, wherein the retaining portion of the shaft comprises a relatively large diameter portion, wherein one of the radially extending surfaces of the retaining portion of the shaft comprises the intersection between the bearing portion and the retaining portion, and wherein the opposite radially extending surface of the retaining portion of the shaft comprises the end of the retaining portion remote from the bearing portion.

8. The wheel assembly according to claim 5 wherein the bearing portion of the shaft comprises a relatively large diameter portion, wherein the retaining portion of the shaft includes a relatively small diameter portion, wherein one of the radially extending surfaces of the retaining portion of the shaft comprises the intersection between the bearing portion and the relatively small diameter portion of the retaining portion, and wherein the opposite radially extending surface comprises an inwardly extending surface formed at the opposite end of the bearing portion from the relatively small diameter portion of the retaining portion of the shaft.

9. The wheel assembly according to claim 5 wherein the securing means comprises cooperating means on the wheel and the cap for mechanically retaining the cap in the second portion of the opening through the wheel.

10. A wheel assembly comprising:
   a shaft including:
      a threaded end portion extending to a shoulder for cooperation with the threaded end portion to secure the wheel assembly to associated apparatus;
      a relatively small diameter cylindrical bearing portion extending from the threaded end portion,
      a relatively large diameter retaining portion extending from a bearing portion,
      said retaining portion including a first substantially radially extending surface comprising the intersection between the bearing portion and the retaining portion and a second substantially radially extending surface comprising the end of the shaft remote from the threaded portion;
   a wheel formed from a self-lubricating thermoplastic material and having a central opening formed therethrough including a first cylindrical portion dimensioned for direct rotatable engagement with the bearing portion of the shaft and a second cylindrical portion for receiving the retaining portion of the shaft;
   said second cylindrical portion of the opening through the wheel including a surface for engagement with the first substantially radially extending surface of the retaining portion of the shaft;
   a cap formed from a self-lubricating thermoplastic material and received in the second cylindrical portion of the opening through the wheel for cooperation therewith and with the retaining portion of the shaft to secure the wheel in rotatable engagement with the shaft;
   said cap including a surface for engagement with the surface of the retaining portion of the shaft comprising the end of the shaft remote from the threaded portion; and
   means for securing the cap in the second cylindrical portion of the opening through the wheel.

11. The wheel assembly according to claim 10 wherein the shaft is formed from a noncorrosive metal.

12. The wheel assembly according to claim 11 further including means formed in the distal end of the threaded end portion of the shaft for selectively securing the shaft against rotation.

13. The wheel assembly according to claim 10 wherein the second cylindrical portion of the opening through the wheel and the cap are dimensioned to extend closely adjacent to the remaining portion of the shaft around its entire periphery.

14. The wheel assembly according to claim 10 wherein the securiing means comprises cooperating means on the wheel and the cap for mechanically retaining the cap in the second cylindrical portion of the opening through the wheel.

15. A wheel assembly comprising:
   a shaft including:
      a threaded end portion extending to a shoulder for cooperation with the threaded portion to secure the wheel assembly to associated apparatus,
      a retaining portion including a relatively small diameter cylindrical portion extending from the threaded end portion,
      a bearing portion comprising a relatively large diameter cylindrical portion extending from the relatively small diameter portion of the retaining portion,
      said retaining portion further including a substantially radially extending surface comprising the intersection of the relatively small diameter cylindrical portion and the bearing portion and a substantially radially extending surface comprising the end of the shaft remote from the threaded end portion;
   a wheel formed from a self-lubricating thermoplastic material and having a central opening formed therethrough including a first cylindrical portion dimensioned for direct rotatable engagement with the bearing portion of the shaft and a second cylindrical portion for receiving the relatively small diameter portion of the retaining portion of the shaft;
   said opening in the wheel further including a surface for engagement with the surface of the retaining portion of the shaft formed at the end thereof remote from the threaded end portion;
   a cap formed from a self-lubricating thermoplastic material and received in the second cylindrical portion of the opening in the wheel for cooperation therewith and with the retaining portion of the shaft to secure the wheel in rotatable engagement with the shaft;
   said cap including a surface for engagement with the surface comprisiing the intersection between the relatively small diameter cylindrical portion of the retaining portion of the shaft and the bearing portion of the shaft; and
   means for securing the cap in the second cylindrical portion of the opening in the wheel.

16. The wheel assembly according to claim 15 wherein the shaft is formed from a noncorrosive metal.

17. The wheel assembly according to claim 16 further including means formed in the distal end of the threaded end portion of the shaft for selectively securing the shaft against rotation.

18. The wheel assembly according to claim 15 wherein the second cylindrical portion of the opening through the wheel and the cap are dimensioned to extend closely adjacent to the retaining portion of the shaft around its entire periphery.

19. The wheel assembly according to claim 15 wherein the securing means comprises cooperating means on the wheel and the cap for mechanically retaining the cap in the second cylindrical portion of the opening through the wheel.

* * * * *

UNITED STATES PATENT OFFICE
CERTIFICATE OF CORRECTION

Patent No. 3,909,066    Dated September 30, 1975

Inventor(s) Bryan T. Snowden

It is certified that error appears in the above-identified patent and that said Letters Patent are hereby corrected as shown below:

Col. 1, line 28, "tends" should be --tend--;
       line 56, "cup" should be --cap--
Col. 4, line 35, after "assembly" insert --50--.
Col. 6, line 42, "radiallly" should be --radially--;
       line 54, before "wheel" insert --the--.
Col. 7, line 2, "selflubricating" should be --self-lubricating--;
       line 33, "has" should be --as--.
Col. 10, line 16, "remaining" should be --retaining--.

Signed and Sealed this sixth Day of January 1976

[SEAL]

Attest:

RUTH C. MASON
Attesting Officer

C. MARSHALL DANN
Commissioner of Patents and Trademarks